US012647900B2

(12) United States Patent
Ryu

(10) Patent No.: US 12,647,900 B2
(45) Date of Patent: Jun. 2, 2026

(54) METHOD AND ELECTRONIC DEVICE FOR ADJUSTING TRANSMISSION POWER OF SIGNAL

(71) Applicant: Samsung Electronics Co., Ltd., Suwon-si (KR)

(72) Inventor: Wansang Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/970,875

(22) Filed: Oct. 21, 2022

(65) Prior Publication Data

US 2023/0125685 A1 Apr. 27, 2023

Related U.S. Application Data

(63) Continuation of application No. PCT/KR2022/013623, filed on Sep. 13, 2022.

(30) Foreign Application Priority Data

Oct. 21, 2021 (KR) ........................ 10-2021-0140962

(51) Int. Cl.
*H04W 52/18* (2009.01)
(52) U.S. Cl.
CPC .................................. *H04W 52/18* (2013.01)
(58) Field of Classification Search
CPC ... H04W 52/18; H04W 52/28; H04W 52/288; H04W 52/38; H04W 88/06; H04W 52/281; H04W 52/0251
See application file for complete search history.

(56) References Cited

U.S. PATENT DOCUMENTS 8,706,026 B2 4/2014 Truong et al.
8,781,437 B2 7/2014 Ngai et al.
(Continued)

FOREIGN PATENT DOCUMENTS

CN 106452490 A 2/2017
KR 10-1601244 B1 3/2016
(Continued)

OTHER PUBLICATIONS (WO 2020141852 A1), Lee et al., Device and Method for Controlling Transmission Power of Electronic Device in Wireless Communication System, Jul. 2020, pp. 1-26 (Year: 2020).*
(Continued)

*Primary Examiner* — Keith Ferguson
(74) *Attorney, Agent, or Firm* — Jefferson IP Law, LLP

(57) ABSTRACT

An electronic device is provided. The electronic device includes a transceiver module supporting at least one communication method and a processor operatively connected to the transceiver module. The processor may identify an output state of a signal corresponding to the at least one communication method through the transceiver module, may detect a signal output level corresponding to the at least one communication method of the signal being output, may identify use pattern information corresponding to the at least one communication method through the transceiver module, and may adjust a transmission power value corresponding to the at least one communication method based on the detected signal output level and the use pattern information.

19 Claims, 7 Drawing Sheets

(56) References Cited

U.S. PATENT DOCUMENTS

| | | | |
|---|---|---|---|
| 9,749,878 | B2 | 8/2017 | Zhu et al. |
| 10,013,038 | B2 | 7/2018 | Mercer et al. |
| 10,397,817 | B2 | 8/2019 | Yang et al. |
| 10,420,023 | B2 | 9/2019 | Ramasamy et al. |
| 10,965,335 | B1 | 3/2021 | Jadhav et al. |
| 11,387,860 | B2 | 7/2022 | Jadhav et al. |
| 2012/0270519 | A1 | 10/2012 | Ngai et al. |
| 2014/0307570 | A1* | 10/2014 | Hong .................. H04B 1/3838 370/252 |
| 2017/0250718 | A1* | 8/2017 | Choi .................... H04W 52/36 |
| 2019/0215765 | A1* | 7/2019 | Ramasamy ......... H04W 52/243 |
| 2019/0372633 | A1 | 12/2019 | Chang et al. |
| 2020/0383068 | A1 | 12/2020 | Yang et al. |
| 2021/0051599 | A1 | 2/2021 | Cha et al. |
| 2021/0051601 | A1 | 2/2021 | Cha et al. |
| 2021/0314876 | A1 | 10/2021 | Zhao et al. |
| 2022/0407573 | A1* | 12/2022 | Dou ...................... H01Q 21/28 |

FOREIGN PATENT DOCUMENTS

| | | | |
|---|---|---|---|
| KR | 10-2018-0096277 | A | 8/2018 |
| KR | 10-2021-0019814 | A | 2/2021 |
| KR | 10-2021-0020462 | A | 2/2021 |
| WO | 2020/125748 | A1 | 6/2020 |
| WO | 2022/045647 | A1 | 3/2022 |

OTHER PUBLICATIONS (CN 112584481 A), Jadhav et al., Wireless Device Performance Optimization Using Dynamic Power Control, Mar. 2021, pp. 1-17 (Year: 2021).*
(WO 2016143422 A1), Sakata, Information Output Device, Information Output Method and Program, Sep. 2016, pp. 1-8 (Year: 2016).*
International Search Report dated Dec. 20, 2022, issued in International Application No. PCT/KR2022/013623.
Korean Office Action dated Nov. 26, 2025, issued in Korean Patent Application No. 10-2021-0140962.

* cited by examiner

START

IDENTIFY SIGNAL OUTPUT STATE ACCORDING TO PLURALITY
OF COMMUNICATION METHODS ～401

IDENTIFY SIGNAL OUTPUT LEVEL CORRESPONDING TO COMMUNICATION
METHOD OF SIGNAL BEING OUTPUT ～403

ADJUST SIGNAL OUTPUT VALUE CORRESPONDING TO EACH COMMUNICATION
METHOD, BASED ON SIGNAL OUTPUT LEVEL AND USE PATTERN INFORMATION ～405

END

START

IDENTIFY SIGNAL OUTPUT STATE ACCORDING TO PLURALITY
OF COMMUNICATION METHODS ～501

DETERMINE AT LEAST ONE COMMUNICATION OPERATION
MODE BASED ON IDENTIFIED SIGNAL OUTPUT STATE ～503

DETERMINE TRANSMISSION POWER FOR EACH
COMMUNICATION METHOD BASED ON USE PATTERN INFORMATION ～505

END

METHOD AND ELECTRONIC DEVICE FOR ADJUSTING TRANSMISSION POWER OF SIGNAL

CROSS-REFERENCE TO RELATED APPLICATION(S)

This application is a continuation application, claiming priority under § 365(c), of an International application No. PCT/KR2022/013623, filed on Sep. 13, 2022, which is based on and claims the benefit of a Korean patent application number 10-2021-0140962, filed on Oct. 21, 2021, in the Korean Intellectual Property Office, the disclosure which is incorporated by reference herein in its entirety.

TECHNICAL FIELD

The disclosure relates to a method and electronic device for adjusting transmission power of a signal.

BACKGROUND ART

An electronic device (e.g., a user equipment (UE)) that supports wireless communication may transmit electromagnetic waves (e.g., a wireless communication signal) for the transmission and reception of data to and from a base station. For example, the electromagnetic waves may have a harmful influence on the human body. In particular, when the electronic device is close to the human body, a bad influence of the electromagnetic waves on the human body may be further increased. Due to such harmfulness of the electromagnetic waves, various organizations around the world are establishing a use criterion (e.g., a specific absorption rate (SAR) regulation) so that the electromagnetic waves are limited to a certain level. For example, the SAR may be a numerical value indicating how much the electromagnetic waves emitted from an electronic device (e.g., a mobile communication terminal) are absorbed by the human body. The SAR uses the unit of KW/g (or mW/g), which may include the amount (KW, W, or mW) of electricity of electromagnetic waves that are absorbed per 1 g of the human body. In general, the electronic device may be configured to perform wireless communication in a way that an SAR reference value (e.g., an SAR regulation, about 1.6 W/Kg) is not exceeded. For example, when electromagnetic waves higher than the SAR reference value occurs, the electronic device that supports wireless communication may at least partially limit or block (e.g., power off) the wireless communication.

An electronic device may support various types of communication methods in supporting wireless communication. For example, the communication methods may include communication methods, such as second-generation (2G), third-generation (3G), fourth-generation (4G), and fifth-generation (5G), and communication methods, such as wireless fidelity (WiFi), Bluetooth (BT), and/or an ultra wide band (UWB). Electronic devices may individually communicate by using respective communication methods or each electronic device may communicate by substantially simultaneously mixing several communication methods.

The above information is presented as background information only to assist with an understanding of the disclosure. No determination has been made, and no assertion is made, as to whether any of the above might be applicable as prior art with regard to the disclosure.

DISCLOSURE

Technical Problem

In an electronic device that supports several types of communication methods, if transmission power is limited based on an SAR regulation (e.g., an SAR reference value), it may be difficult for the electronic device to implement optimal communication performance. For example, when performing wireless communication using a plurality of communication methods, the electronic device outputs electromagnetic waves generated based on the plurality of communication methods. If the plurality of communication methods is block limited by taking an SAR regulation into consideration, a reduction of an overall communication speed may be increased.

Aspects of the disclosure are to address at least the above-mentioned problems and/or disadvantages and to provide at least the advantages described below. Accordingly, an aspect of the disclosure is to provide an electronic device that may individually configure a power restriction applied to each communication method by taking into consideration communication methods and an SAR regulation, based on a communication environment and use pattern of the electronic device, and can perform optimized wireless communication while satisfying an SAR reference value according to the SAR regulation by outputting, with designated power or less, output power (e.g., transmission power) of communication signals using a plurality of communication methods.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a transceiver module supporting at least one communication method and a processor operatively connected to the transceiver module. The processor may identify an output state of a signal corresponding to the at least one communication method through the transceiver module, may detect a signal output level corresponding to the at least one communication method of the signal being output, may identify use pattern information corresponding to the at least one communication method through the transceiver module, and may adjust a transmission power value corresponding to the at least one communication method based on the detected signal output level and the use pattern information.

In accordance with another aspect of the disclosure, a method is provided. The method includes an operation of identifying an output state of a signal corresponding to at least one communication method by using a transceiver module, an operation of detecting a signal output level corresponding to the at least one communication method of the signal being output, an operation of identifying use pattern information corresponding to the at least one communication method through the transceiver module, and an operation of adjusting a transmission power value corresponding to the at least one communication method, based on the detected signal output level and the use pattern information.

Advantageous Effects

In various embodiments of the disclosure, a communication reference value (e.g., a power restriction reference value applied to each communication method) corresponding to each of a plurality of communication methods may be configured based on a communication environment of an electronic device and use pattern information, and transmission power (e.g., output power) according to each communication method can be determined so that the configured communication reference value is satisfied. The electronic device can implement optimal communication performance for a plurality of communication methods by individually supplying transmission power for each communication method. The electronic device can implement optimal communication performance according to a communication environment and use pattern information while satisfying an electromagnetic wave limiting condition (e.g., a reference value according to an SAR regulation or a power restriction reference value applied to a communication method).

According to an embodiment, the electronic device can implement optimized communication performance for a plurality of communication methods, and use convenience according to the execution of wireless communication can be improved. In addition, various effects that are directly or indirectly checked through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
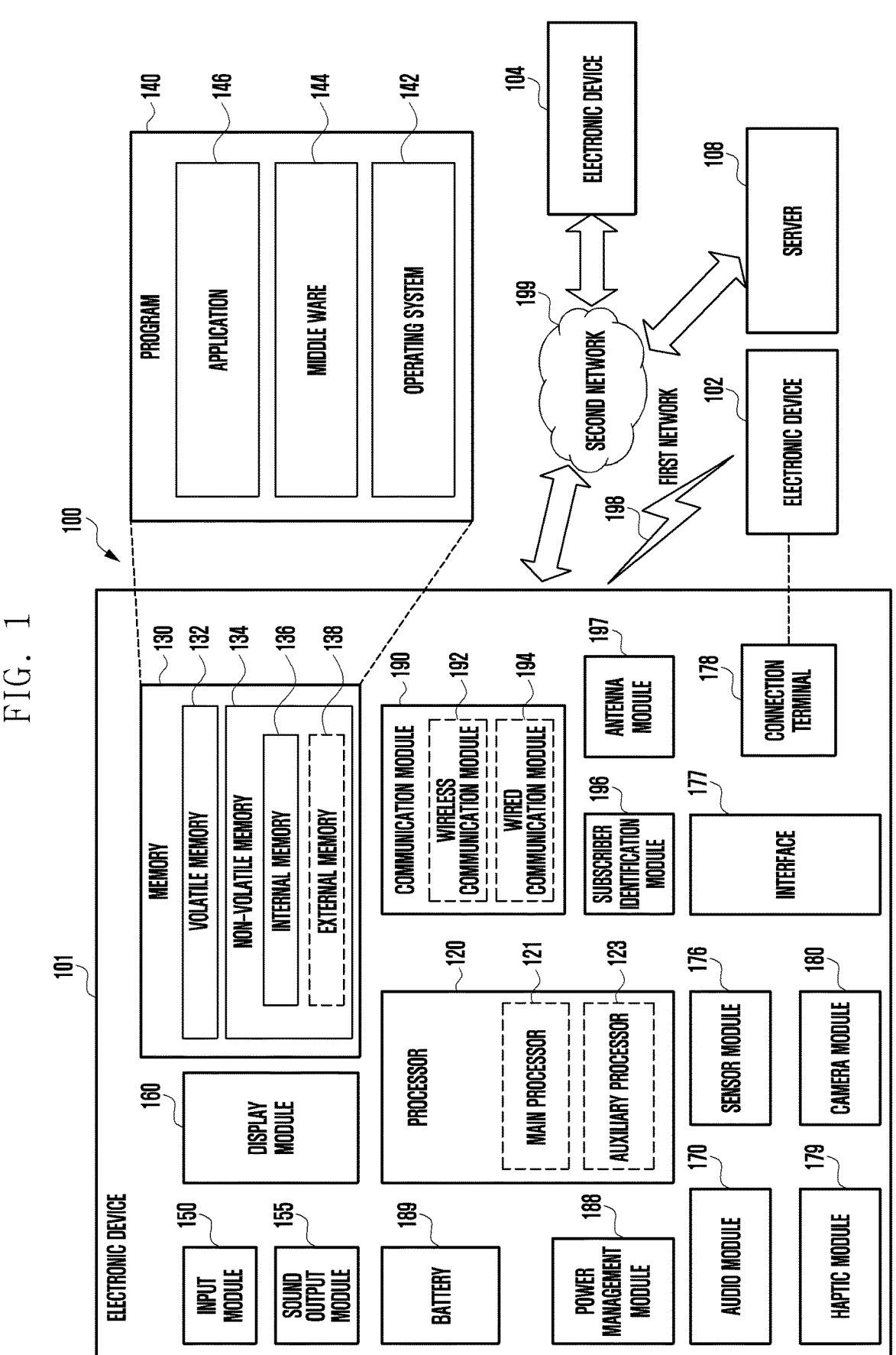
FIG. 1 is a block diagram of an electronic device within a network environment according to an embodiment of the disclosure.

FIG. 1 illustrates an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
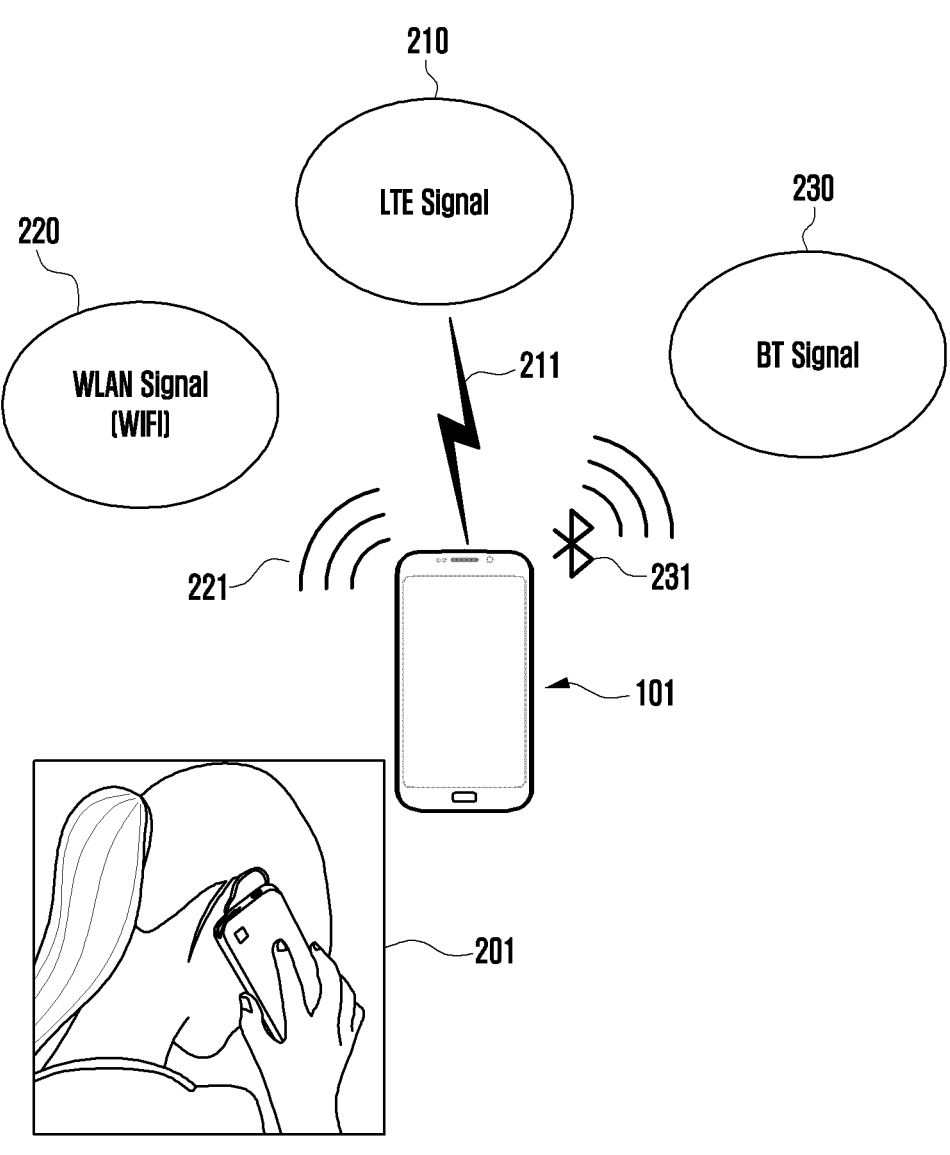
FIG. 2 is a diagram illustrating a situation in which a user uses an electronic device supporting a plurality of communication methods according to an embodiment of the disclosure.

FIG. 2 is a diagram illustrating a situation 201 in which a user uses an electronic device supporting a plurality of communication methods according to an embodiment of the disclosure.

Referring to FIG. 2, an electronic device (e.g., the electronic device 101 in FIG. 1) may support various communication methods (e.g., long term evolution (LTE) communication 211, WiFi communication 221, and/or Bluetooth (BT) communication 231). For example, when performing the LTE communication 211, the electronic device 101 may supply LTE power 210 based on an LTE antenna corresponding to the LTE communication 211, and may transmit an LTE communication signal that corresponds to an LTE communication frequency through the LTE antenna. Furthermore, for example, when performing WLAN communication (e.g., the WiFi communication 221), the electronic device 101 may supply WiFi power (WiFi power) 220 based on a WiFi antenna corresponding to the WiFi communication 221, and may transmit a WiFi communication signal that corresponds to a WiFi communication frequency through the WiFi antenna. Furthermore, for example, when performing the BT communication 231, the electronic device 101 may supply BT power 230 based on a BT antenna corresponding to the BT communication 231, and may transmit a BT communication signal that corresponds to a BT communication frequency through the BT antenna.

According to an embodiment, a plurality of antennas for supporting a plurality of communication methods may be disposed in the electronic device 101. Each of the antennas may be designed based on a frequency region of a supported communication method. According to an embodiment, the electronic device 101 may support a plurality of communication methods, based on a first network (e.g., the first network 198 in FIG. 1) (e.g., the Bluetooth communication 230 and/or the WiFi communication 220) corresponding to a short-distance communication network and a second network (e.g., the second network 199 in FIG. 1) (e.g., a legacy cellular network (2G, 3G, 4G, or LTE), a 5G network, and/or a next-generation communication network) corresponding to a long-distance communication network, through a communication module (e.g., the communication module 190 in FIG. 1).

According to an embodiment, the electronic device 101 may communicate by individually using each communication method (e.g., the LTE communication 211, the WiFi communication 221, or Bluetooth communication 231), or may communicate by substantially simultaneously mixing several methods.

According to an embodiment, the electronic device 101 limits transmission power (e.g., output power) according to an SAR regulation (e.g., an electromagnetic wave limiting condition). Transmission power corresponding to each communication method may be determined. The SAR regulation may mean a limiting condition for predetermined electromagnetic waves so that a bad influence on the human body due to electromagnetic waves generated from the electronic device 101 is minimized. For example, the sum of SARs according to the SAR regulation may be determined within about 1.6 W/Kg. This is a condition for satisfying the SAR regulation, and means that the sum of the SARs is a maximum of 1.6 W/Kg. For example, when the electronic device 101 performs only the LTE communication 211, the LTE power 210 corresponding to the total sum (e.g., about 1.6 W/Kg) of SARs may be determined as about 24 dBm or less. The electronic device 101 may supply the LTE antenna with the LTE power 210 of about 24 dBm or less, and may transmit an LTE communication signal to an external electronic device (e.g., the electronic device 102, 104 in FIG. 1) through the LTE antenna. The electronic device 101 may satisfy an SAR regulation (e.g., the sum of the SARs is determined within about 1.6 W/Kg) upon LTE communication. According to an embodiment, the electronic device 101 may supply transmission power to the LTE antenna and may transmit an LTE communication signal that satisfies a preconfigured SAR regulation, based on the LTE power 210 according to the SAR regulation.

Furthermore, for example, when the electronic device 101 performs only the BT communication 231, the BT power 230 corresponding to the total sum (e.g., about 1.6 W/Kg) of SARs may be determined as about 15 dBm or less. The electronic device 101 may supply the BT antenna with the BT power 230 of about 15 dBm or less, and may transmit a BT communication signal to the external electronic device 102, 104 through the BT antenna. The electronic device 101 may satisfy an SAR regulation (e.g., the sum of the SARs is determined within about 1.6 W/Kg) upon BT communication. According to an embodiment, the electronic device 101 may supply transmission power to the BT antenna and may transmit a BT communication signal that satisfies a preconfigured SAR regulation, based on the BT power 230 according to the SAR regulation.

According to an embodiment, the electronic device 101 may communicate by substantially simultaneously mixing several methods. For example, the electronic device 101 may perform listening to music according to the BT communication 231 with a wireless earphone while performing Internet browsing according to the LTE communication 211. The electronic device 101 may substantially simultaneously perform a plurality of communication methods, and transmission power according to the execution of the plurality of communication methods may be determined. For example, the electronic device 101 that substantially simultaneously supports the LTE communication 211 and the BT communication 231 may supply the LTE antenna with the LTE power 210, and may supply the BT antenna with the BT power 230. According to an embodiment, the electronic device may simultaneously perform the LTE communication 211 and the BT communication 231 by taking an SAR regulation into consideration.

According to an embodiment, the electronic device 101 may determine transmission power corresponding to each communication method so that optimal communication performance corresponding to each communication method is implemented while satisfying an SAR regulation (e.g., an electromagnetic wave limiting condition). According to an embodiment, the electronic device 101 may identify traffic (e.g., a signal output state) according to at least one communication method, and may supply transmission power to each of antennas (e.g., an LTE antenna, an WiFi antenna, and a Bluetooth antenna) that supports the at least one communication method (e.g., the LTE communication 211, the WiFi communication 221, and the Bluetooth communication 231), based on the identified traffic. For example, the LTE antenna may be designed so that a communication signal is generated based on a frequency band of the LTE communication 211. The WiFi antenna may be designed so that a communication signal based on a frequency band (e.g., 2.4 GHz or 5 GHz) of the WiFi communication 221 is generated. According to an embodiment, the electronic device 101 may determine power supplied to an antenna that corresponds to each communication method, based on use pattern information (e.g., a use ratio of a plurality of communication methods) of a user.

Figure 3:
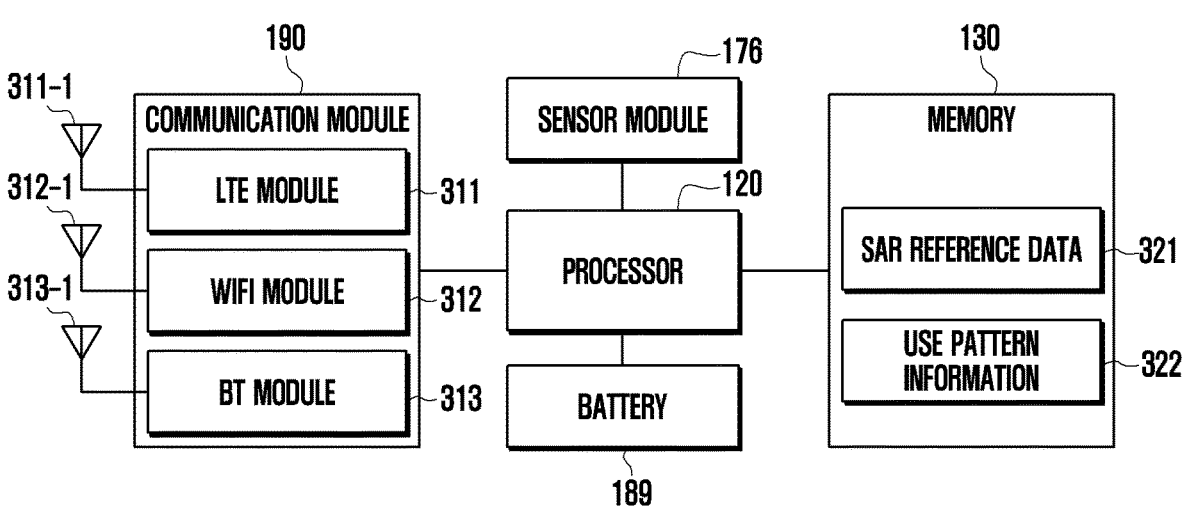
FIG. 3 is a block diagram of an electronic device supporting a plurality of communication methods by taking into consideration a communication environment according to an embodiment of the disclosure.

FIG. 3 is a block diagram of an electronic device supporting a plurality of communication methods by taking into consideration a communication environment according to an embodiment of the disclosure.

An electronic device (e.g., the electronic device 101 in FIG. 1) in FIG. 3 may be at least partially similar to the electronic device 101 in FIG. 2 or may further include other embodiments of the electronic device 101.

According to an embodiment, the electronic device 101 may perform wireless communication based on a plurality of communication methods, and may supply transmission power to an antenna corresponding to each of the communication methods under a condition in which an SAR regulation (e.g., an electromagnetic wave limiting condition) is satisfied. The electronic device 101 may determine transmission power that is supplied to an antenna corresponding to at least one communication method so that optimal communication performance is implemented by taking into consideration a communication situation and use pattern information of a user.

Referring to FIG. 3, the electronic device 101 may include a processor (e.g., the processor 120 in FIG. 1), a memory (e.g., the memory 130 in FIG. 1), a sensor module (e.g., the sensor module 176 in FIG. 1), a battery (e.g., the battery 189 in FIG. 1), and/or a communication module (e.g., the communication module 190 in FIG. 1). The electronic device 101 may support a plurality of communication methods, and may include an LTE module 311, a WiFi module 312, and/or a BT module 313 in the communication module 190. The communication module 190 may be a transceiver module, the LTE module 311 may be an LTE transceiver module and the WiFi module 312 may be a WiFi transceiver module configured to transmit and receive. For example, the electronic device 101 may support an LTE communication method through the LTE module 311, may support a WiFi communication method through the WiFi module 312, and may support a BT communication method through the BT module 313. The electronic device 101 may determine a transmission power value to be supplied to each communication module (e.g., the LTE module 311, the WiFi module 312, and/or the BT module 313), based on SAR reference data 321 (e.g., a communication reference value that satisfies an electromagnetic wave output limiting condition (e.g., an SAR regulation), output configuration data for each communication method in the electromagnetic wave output limiting condition) and use pattern information 322 that are stored in the memory 130. According to an embodiment, the electronic device 101 may determine a transmission power value supplied to each communication module so that optimal communication performance is implemented, based on a plurality of communication modules under the condition in which the SAR regulation is satisfied.

The processor 120 may control at least another element (e.g., hardware or software element) by executing a program (e.g., the program 140 in FIG. 1) stored in the memory 130, and may perform various data processing or operations. For example, the processor 120 may determine transmission power to be supplied to the LTE module 311, the WiFi module 312, and/or the BT module 313 that are included in the communication module 190, based on the SAR reference data 321 and the use pattern information 322 stored in the memory 130. The processor 120 may supply transmission power to the communication module 190 through the battery 189, and may perform wireless communication according to various communication methods.

The memory 130 may store the SAR reference data 321 having a condition in which an SAR regulation (e.g., an electromagnetic wave limiting condition) is satisfied and the use pattern information 322 indicative of the use ratio of a user according to each communication method. For example, the SAR reference data 321 may include a transmission power value at which the best communication performance can be implemented while satisfying the SAR regulation, based on various communication scenarios. For example, the communication scenarios may include a first scenario in which only LTE communication is performed, a second scenario in which only WiFi communication is performed, a third scenario in which only BT communication is performed, a fourth scenario in which LTE communication and BT communication are formed together, and/or a fifth scenario in which WiFi communication and BT communication are formed together. The communication scenarios may be variously combined based on communication methods (e.g., LTE communication, WiFi communication, and BT communication) which may be supported by the electronic device 101, and are not limited to the first scenario to the fifth scenario. For example, in a situation (e.g., a scenario) in which LTE communication and BT communication are performed together in the electronic device 101, the processor 120 may determine first transmission power to be supplied to the LTE module 311 and second transmission power to be supplied to the BT module 313, based on the SAR reference data 321. According to an embodiment, the SAR reference data 321 may include data for transmission power that is calculated by performing several experiments, assuming various communication scenarios. For example, the SAR reference data 321 may include a communication reference value that satisfies an electromagnetic wave output limiting condition (e.g., an SAR regulation) and/or output configuration data for each communication method in the electromagnetic wave output limiting condition. The SAR reference data 321 may be stored when the electronic device 101 is designed by a developer.

For example, the use pattern information 322 may include a ratio (e.g., the ratio of time used, the ratio of the amount of data used, or the ratio of frequency of use) of a specific communication method used by a user, based on a plurality of communication methods. The use pattern information 322 may include a ratio of wireless communication that is performed by a user based on multiple communication methods for a configured period (e.g., a day, a week, or a month). For example, the use pattern information 322 may include information in which the time for which the LTE module 311 is activated, the time for which the WiFi module 312 is activated, and/or the time for which the BT module 313 is activated are proportionally divided on the basis of a day (e.g., 24 hours). Furthermore, for example, the use pattern information 322 may include information in which data usage through the LTE module 311, data usage through the WiFi module 312, and data usage through the BT module 313 are proportionally divided for a given time. Furthermore, for example, the use pattern information 322 may include information in which the time for which LTE communication based on the LTE module 311 has been performed, the time for which WiFi communication based on the WiFi module 312 has been performed, and/or the time for which BT communication based on the BT module 313 has been performed are proportionally divided on the basis of a day (e.g., 24 hours). According to an embodiment, the processor 120 may proportionally divide a transmission power value to be supplied to each communication module based on the use pattern information 322, and may determine a transmission power value to be supplied to each communication module by incorporating the divided ratio into a total transmission power value that satisfies an SAR regulation.

The sensor module 176 may include a proximity sensor, a grip sensor, and/or a gyro sensor for detecting whether the electronic device 101 has approached to the human body. According to an embodiment, the electronic device 101 may detect whether a user approaches through the proximity sensor, and may adjust transmission power by taking an SAR regulation into consideration when identifying that the user has approached within a configured distance. According to another embodiment, the electronic device 101 may identify a disposition location of the electronic device 101, a disposition posture of the electronic device 101, and whether the electronic device 101 is used by using the grip sensor and the gyro sensor, and may determine whether to adjust transmission power by taking an SAR regulation into consideration.

The battery 189 may supply power to at least one element which constitutes the electronic device 101. For example, when performing wireless communication, the processor 120 may supply transmission power to the communication module 190, and may transmit a communication signal to an external electronic device. For example, the processor 120 may supply configured transmission power to the LTE module 311 through the battery 189, and may transmit, to an external electronic device, an LTE communication signal (e.g., a wireless communication signal having an LTE communication frequency) that is generated based on the LTE antenna 311-1. According to an embodiment, the processor 120 may determine transmission power to be supplied to each communication module 190, based on the SAR reference data 321 and the use pattern information 322, and may individually supply the determined transmission power by using the battery 189. For example, the processor 120 may supply LTE transmission power to the LTE module 311, may supply WiFi transmission power to the WiFi module 312, and may supply BT transmission power to the BT module 313.

The communication module 190 may include communication modules (e.g., the LTE module 311, the WiFi module 312, and/or the BT module 313) corresponding to communication methods (e.g., LTE communication, WiFi communication, and BT communication) which may be supported by the electronic device 101. For example, the LTE module 311 may be connected to an LTE antenna 311-1 through which a communication signal having an LTE communication frequency is generated. The WiFi module 312 may be connected to a WiFi antenna 312-1 through which a communication signal having a WiFi communication frequency is generated. The BT module 313 may be connected to a BT antenna 313-1 through which a communication signal having a BT communication frequency is generated. According to an embodiment, at least one communication module included in the communication module 190 is not limited, and may include a communication module corresponding to a communication method which may be supported by the electronic device 101.

According to an embodiment, as in Table 1 below, the SAR reference data 321 stored in the memory 130 may include a preconfigured value. For example, the SAR reference data 321 may include a communication reference value that satisfies an electromagnetic wave output limiting condition (e.g., an SAR regulation) and/or output configuration data (e.g., a transmission power value (dBm) for an electromagnetic wave output) of each communication method (e.g., an LTE method, a WiFi method, or a BT method) in the electromagnetic wave output limiting condition.

TABLE 1

| SAR value (W/Kg) | LTE transmission power (dBm) | WiFi transmission power (dBm) | BT transmission power (dBm) |
|---|---|---|---|
| 1.6 | 24 | 19 | 15 |
| 1.5 | 23 | 19 | 15 |
| 1.4 | 22 | 18.5 | 15 |
| 1.3 | 21 | 18 | 15 |
| 1.2 | 20 | 17.5 | 14.5 |
| 1.1 | 19 | 17 | 14 |
| 1.0 | 18 | 16.5 | 13.5 |
| 0.9 | 17 | 16 | 13 |
| 0.8 | 16 | 15.5 | 12.5 |
| 0.7 | 15 | 15 | 12 |
| 0.6 | 14 | 14.5 | 11.5 |
| 0.5 | 13 | 14 | 11 |
| 0.4 | 12 | 13 | 10.5 |
| 0.3 | 11 | 11 | 10 |
| 0.2 | 10 | 9 | 8 |
| 0.1 | 9 | 7 | 6 |

For example, the sum of SARs according to an SAR regulation (e.g., an electromagnetic wave limiting condition) may be determined within about 1.6 W/Kg. When the sum of SARs is less than about 1.6 W/Kg, the processor 120 may identify that the SAR regulation has been satisfied. According to an embodiment, the processor 120 of the electronic device 101 may supply transmission power to the at least one communication module 190 so that the best communication performance is implemented through the at least one communication module 190 under the condition in which the SAR regulation is satisfied. For example, if only LTE communication is performed, the processor 120 may supply the LTE module 311 with a transmission power value (e.g., about 24 dBm) of LTE corresponding to about 1.6 W/Kg, on the basis of the total sum (e.g., about 1.6 W/Kg) of SARs. If only BT communication is performed, the processor 120 may supply the BT module 313 with a transmission power value (e.g., about 15 dBm) of BT corresponding to about 1.6 W/Kg, on the basis of the total sum (e.g., about 1.6 W/Kg) of SARs.

According to an embodiment, when substantially simultaneously performing LTE communication and BT communication, the electronic device 101 may determine a first communication reference value for LTE communication and a second communication reference value for BT communication by dividing the first communication reference value and the second communication reference value based on the use pattern information 322 stored in the memory 130. For example, the processor 120 may determine a first communication reference value for LTE communication as about 1 W/Kg and determine a second communication reference value for BT communication as about 0.6 W/Kg, on the basis of the total sum (e.g., about 1.6 W/Kg) of SARs. Referring to Table 1, the processor 120 may determine a first transmission power value (e.g., about 18 dBm) of LTE corresponding to a first communication reference value (e.g., about 1 W/Kg), and may determine a second transmission power value (e.g., about 11.5 dBm) of BT corresponding to a second communication reference value (e.g., about 0.6 W/Kg). When performing LTE communication and BT communication together, the electronic device 101 may supply the LTE module 311 with a first transmission power value (e.g., about 18 dBm) based on the first communication reference value, and may supply the BT module 313 with a second transmission power value (e.g., about 11.5 dBm) based on the second communication reference value. According to an embodiment, the electronic device 101 may supply transmission power for each communication method so that the best communication performance for LTE communication and BT communication is implemented while satisfying the total sum (e.g., about 1.6 W/Kg) of SARs according to an SAR regulation.

According to an embodiment, when substantially simultaneously performing a plurality of communication methods, the electronic device 101 may determine a transmission power value corresponding to each communication method based on use pattern information of a user within a condition in which an SAR regulation is satisfied. According to an embodiment, the electronic device 101 may determine a transmission power value supplied to at least one communication module (e.g., the LTE module 311, the WiFi module 312, and/or the BT module 313) so that the best communication performance is implemented.

According to an embodiment, when a plurality of communication methods (e.g., first communication and second communication) is simultaneously performed, the electronic device 101 may check an isolation distance between a first antenna corresponding to the first communication and a second antenna corresponding to the second communication, and may calculate an SAR to peak location separation ratio (SPLSR) based on the checked distance. The electronic device 101 may also adjust a transmission power value based on the calculated SPLSR. For example, the isolation distance R between the first antenna and the second antenna may be previously stored in the memory 130 or may be calculated based on coordinate information corresponding to each antenna.

According to various embodiments, the electronic device 101 may include the communication module 190 which supports at least one communication method (e.g., LTE communication, WiFi communication, and BT communication) and the processor 120 operatively connected to the communication module 190. The processor 120 may identify an output state of a signal corresponding to the at least one communication method through the communication module 190, may detect a signal output level corresponding to the at least one communication method of the signal being output, may identify use pattern information corresponding to the at least one communication method through the communication module 190, and may adjust a transmission power value corresponding to the at least one communication method based on the detected signal output level and the use pattern information 322.

According to an embodiment, the processor 120 may supply the transmission power value corresponding to the at least one communication method while satisfying an electromagnetic wave limiting condition (e.g., an SAR regulation).

According to an embodiment, the processor 120 may identify a reference value for satisfying the electromagnetic wave limiting condition, and may determine the transmission power value corresponding to the at least one communication method based on the identified reference value.

According to an embodiment, the processor 120 may determine a first communication reference value corresponding to a first communication method and a second communication reference value corresponding to a second communication method, based on the reference value, and may determine a first transmission power value corresponding to the first communication method based on the first communication reference value and a second transmission power value corresponding to the second communication method based on the second communication reference value.

According to an embodiment, the processor 120 may supply the first transmission power value to a first communication module corresponding to the first communication method, and may transmit a first communication signal based on the first transmission power value through a first antenna of the first communication module.

According to an embodiment, the processor 120 may supply the second transmission power value to a second communication module corresponding to the second communication method, and may transmit a second communication signal based on the second transmission power value through a second antenna of the second communication module.

According to an embodiment, the processor 120 may check an isolation distance between a first antenna and a second antenna that transmit a signal, based on the first communication method, and may configure at least one of the first transmission power value and/or the second transmission power value to be low when an SAR to peak location separation ratio (SPLSR) calculated by using the checked distance is greater than a threshold value.

According to an embodiment, the processor 120 may identify a use ratio (e.g., a traffic ratio) corresponding to the at least one communication method based on the identified signal output state, and may adjust the transmission power value corresponding to the at least one communication method based on the identified use ratio.

According to an embodiment, the processor 120 may identify an electric field situation based on the detected signal output level, and may adjust the transmission power value corresponding to the at least one communication method, based on the identified electric field situation.

According to an embodiment, the processor 120 may maintain the transmission power value when a communication method is in a weak electric field state, based on the at least one communication method.

According to an embodiment, the communication module may include the LTE module 311 that supports LTE communication, the WiFi module 312 that supports WiFi communication, and the BT module 313 that supports BT communication.

According to an embodiment, the use pattern information 322 may include a ratio at which communication is performed based on the at least one communication method among a plurality of communication methods supported by the electronic device 101.

According to an embodiment, the ratio at which the communication is performed may include the ratio of time used, the ratio of the amount of data used, and/or the ratio of frequency of use based on the at least one communication method.

Figure 4:
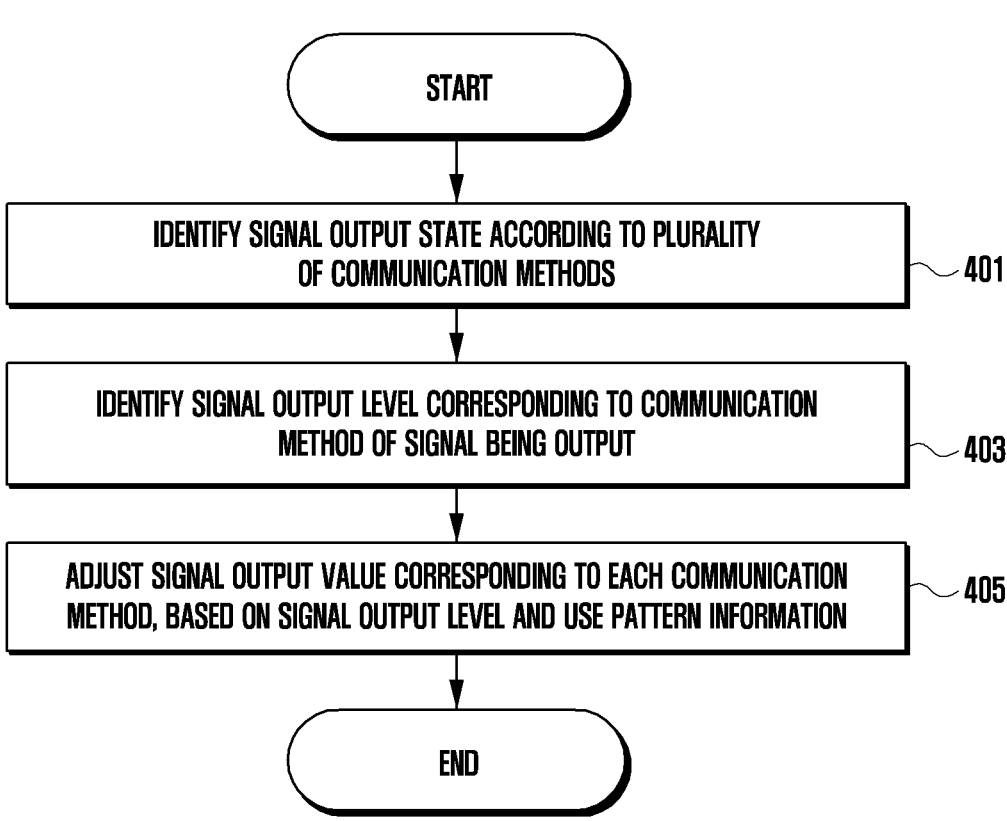
FIG. 4 is a flowchart illustrating a method of adjusting transmission power while satisfying an SAR regulation according to an embodiment of the disclosure.

FIG. 4 is a flowchart illustrating a method of adjusting transmission power while satisfying an SAR regulation (e.g., an electromagnetic wave limiting condition) according to an embodiment of the disclosure.

An electronic device (e.g., the electronic device 101 in FIG. 1) in FIG. 4 may be at least partially similar to the electronic device 101 in FIG. 2 or may further include other embodiments of the electronic device 101. The electronic device 101 in FIG. 4 may include at least one element illustrated in FIG. 3.

Referring to FIG. 4, in operation 401, a processor (e.g., the processor 120 in FIG. 1) of the electronic device 101 may identify a signal output state according to a plurality of communication methods (e.g., LTE communication, WiFi communication, and BT communication). For example, the processor 120 may identify whether a communication signal according to at least one communication method is being transmitted, based on transmission power supplied through a battery (e.g., the battery 189 in FIG. 1). The processor 120 may identify whether wireless communication is being performed based on one communication method or whether wireless communication is being performed based on a plurality of communication methods.

In operation 403, the processor 120 may identify a signal output level (e.g., transmission power) corresponding to a communication method of a signal being output. For example, the processor 120 may be in the state in which a signal output level thereof has been previously determined in accordance with a communication method of wireless communication being performed. The memory 130 of the electronic device 101 may be in the state in which signal output levels corresponding to a plurality of communication methods, respectively, have been stored as SAR reference data (e.g., the SAR reference data 321 in FIG. 3). For example, when only LTE communication is being performed, the SAR reference data 321 may include an LTE communication reference value corresponding to the LTE communication and a transmission power value corresponding to the LTE communication reference value. According to an embodiment, the SAR reference data 321 may include a communication reference value determined in accordance which each of a plurality of communication methods and a transmission power value corresponding to the communication reference value. According to an embodiment, the processor 120 may identify a signal output level corresponding to a communication method of a signal being output, based on the SAR reference data 321 stored in the memory 130.

According to an embodiment, as in Table 2 below, the SAR reference data 321 stored in the memory 130 may include a transmission power limit based on the execution of at least one communication method. For example, the transmission power limit may be a maximum value of a transmission power value.

TABLE 2

| Communication method | SAR regulation [W/Kg] | Transmission power limit [dBm] |
|---|---|---|
| LTE | LTE < 1.6 | LTE < 24 dBm |
| WiFi | WiFi < 1.6 | WiFi < 19 dBm |
| BT | BT < 1.6 | BT < 15 dBm |
| LTE + WiFi | LTE < 1.1 | LTE < 19 dBm |
| | WiFi < 0.5 | WiFi < 14 dBm |
| LTE + BT | LTE < 1.3 | LTE < 21 dBm |
| | BT < 0.3 | BT < 10 dBm |
| LTE + WiFi + BT | LTE < 1.0 | LTE < 18 dBm |
| | WiFi < 0.4 | WiFi < 13 dBm |
| | BT < 0.2 | BT < 8 dBm |

For example, the sum of SARs according to an SAR regulation (e.g., an electromagnetic wave limiting condition) may be determined within about 1.6 W/Kg. The processor 120 may identify that the SAR regulation has been satisfied when the sum of the SARs is less than about 1.6 W/Kg.

For example, the processor 120 may determine a communication reference value (e.g., the limit of a transmission power value determined by taking into consideration an SAR regulation) that corresponds to at least one communication method in the condition in which the SAR regulation is satisfied. Table 2 illustrates a transmission power limit that corresponds to a communication reference value determined based on at least one communication method.

According to an embodiment, when the processor 120 performs only LTE communication, an LTE communication reference value may be determined as less than about 1.6 W/Kg, and may supply an LTE module (e.g., the LTE module 311 in FIG. 3) with a transmission power value of less than about 24 dBm. The processor 120 may supply a transmission power value of about 24 dBm to the LTE module 311 in the condition in which only LTE communication is performed, and may implement the best communication performance for the LTE communication. The processor 120 may implement maximum communication performance according to an LTE communication method while satisfying an SAR regulation.

According to an embodiment, when the processor 120 performs LTE communication and WiFi communication together, an LTE communication reference value may be determined as less than about 1.1 W/Kg, and a WiFi communication reference value may be determined as less than about 0.5 W/Kg. In this case, the processor 120 may supply the LTE module 311 with a transmission power value of less than about 19 dBm, and may supply a WiFi module (e.g., the WiFi module 312 in FIG. 3) with a transmission power value of less than about 14 dBm. In the condition in which LTE communication and WiFi communication are performed together, the processor 120 may supply the LTE module 311 with a transmission power value of about 19 dBm, may supply the WiFi module 312 with a transmission power value of less than about 14 dBm, and may implement the best communication performance for an LTE communication method and a WiFi communication method. The processor 120 may implement maximum communication performance according to the LTE communication method and the WiFi communication method while satisfying an SAR regulation.

According to an embodiment, when the processor 120 performs LTE communication, WiFi communication, and BT communication together, an LTE communication reference value may be determined as less than about 1.0 W/Kg, a WiFi communication reference value may be determined as less than about 0.4 W/Kg, and a BT communication reference value may be determined as less than about 0.2 W/Kg. In this case, the processor 120 may supply the LTE module 311 with a transmission power value of less than about 18 dBm, may supply the WiFi module 312 with a transmission power value of less than about 13 dBm, and may supply a BT module (e.g., the BT module 313 in FIG. 3) with a transmission power value of less than about 8 dBm. In the condition in which LTE communication, WiFi communication, and/or BT communication are performed together, the processor 120 may supply the LTE module 311 with a transmission power value of about 18 dBm, may supply the WiFi module 312 with a transmission power value of less than about 13 dBm, may supply the BT module 313 with a transmission power value of less than about 8 dBm, and may implement the best communication performance for an LTE communication method, a WiFi communication method, and/or a BT communication method. The processor 120 may implement maximum communication performance for the LTE communication method, the WiFi communication method, and/or the BT communication method while satisfying an SAR regulation.

In operation 405, the processor 120 may adjust a transmission power value (e.g., a signal output value or a transmission power value) corresponding to each communication method, based on the identified signal output level and use pattern information stored in the memory 130. For example, the use pattern information 322 may include a ratio (e.g., the ratio of time used, the ratio of the amount of data used, or the ratio of frequency of use) of wireless communication that is used by a user based on a plurality of communication methods. For example, when the electronic device 101 supports three communication methods (e.g., LTE communication, WiFi communication, and/or BT communication), the processor 120 may store, in the memory 130, a use ratio of each communication method for each user.

According to an embodiment, the use pattern information may be managed for each user as in Table 3 below, may be updated according to a given period, and may be stored in the memory 130.

TABLE 3

| | Use ratios according to communication methods | | |
| --- | --- | --- | --- |
| | LTE communication | WiFi communication | BT communication |
| First user | 0.5 | 0.3 | 0.2 |
| Second user | 0.3 | 0.6 | 0.1 |

According to an embodiment, the processor 120 may incorporate a use ratio for each communication method based on the total sum (e.g., about 1.6 W/Kg) of SARs according to an SAR regulation (e.g., an electromagnetic wave limiting condition), and may determine a communication reference value corresponding to each communication method.

Referring to the first user in Table 3, when performing LTE communication, WiFi communication, and BT communication together, the processor 120 may determine an LTE communication reference value of about 0.8 W/kg in accordance with the LTE communication, may determine a WiFi communication reference value of about 0.48 W/kg in accordance with the WiFi communication, and may determine a BT communication reference value of about 0.32 W/kg in accordance with the BT communication, on the basis of the total sum (e.g., about 1.6 W/Kg) of SARs. Referring to Table 1, the processor 120 may determine, as about 16 dBm, an LTE transmission power value corresponding to the LTE communication reference value of about 0.8 W/kg, may determine, as about 14 dBm, a WiFi transmission power value corresponding to the WiFi communication reference value of about 0.48 W/kg, and may determine, as about 10 dBm, a BT transmission power value corresponding to the BT communication reference value of about 0.32 W/kg. According to an embodiment, the processor 120 may supply transmission power so that a signal having the intensity of about 16 dBm is output to the LTE module 311, may supply transmission power so that a signal having the intensity of about 14 dBm is output to the WiFi module 312, and may supply transmission power so that a signal having the intensity of about 10 dBm is output to the BT module 313.

According to an embodiment, when a plurality of communication methods (e.g., LTE communication, WiFi communication, and/or BT communication) is substantially simultaneously performed, the processor 120 of the electronic device 101 may identify a signal output level corresponding to each communication method within the condition in which an SAR regulation is satisfied. The processor 120 may adjust a transmission power value (e.g., a signal output value) corresponding to each communication method, based on use pattern information for each user, which is stored in the memory 130.

According to an embodiment, the electronic device 101 may determine a transmission power value supplied to at least one communication module (e.g., the LTE module 311, the WiFi module 312, and/or the BT module 313) so that the best communication performance for each of a plurality of communication methods is implemented.

Figure 5:
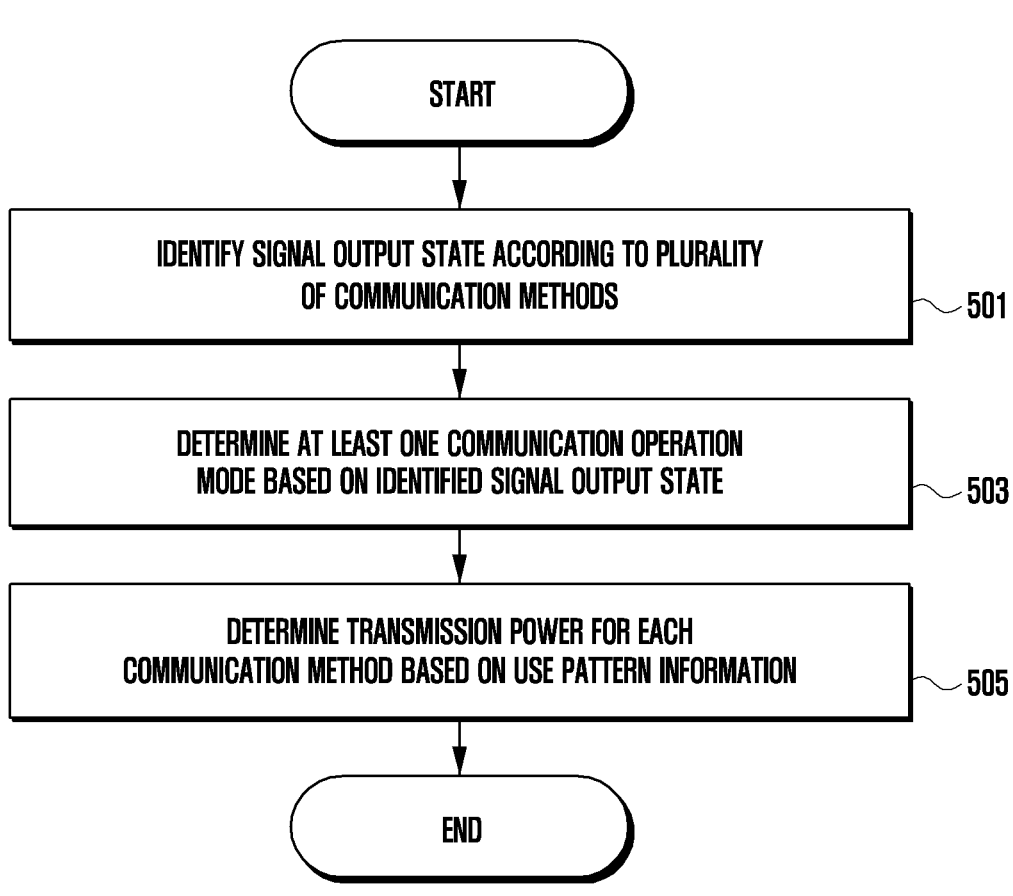
FIG. 5 is a flowchart illustrating a method of selecting one of a plurality of communication modes according to an embodiment of the disclosure.

FIG. 5 is a flowchart illustrating a method of selecting one of a plurality of communication modes according to an embodiment of the disclosure.

An electronic device (e.g., the electronic device 101 in FIG. 1) in FIG. 5 may be at least partially similar to the electronic device 101 in FIG. 2 or may further include other embodiments of the electronic device 101. The electronic device 101 in FIG. 5 may include at least one element illustrated in FIG. 3.

Referring to FIG. 5, in operation 501, a processor (e.g., the processor 120 in FIG. 1) of the electronic device 101 may identify a signal output state according to a plurality of communication methods (e.g., LTE communication, WiFi communication, and/or BT communication). For example, the processor 120 may identify whether a communication signal according to at least one communication method is being transmitted, based on transmission power that is supplied through a battery (e.g., the battery 189 in FIG. 1). The processor 120 may identify whether wireless communication for each of the plurality of communication methods is being performed.

In operation 503, the processor 120 may determine at least one communication operation mode (e.g., a first mode, a second mode, and/or a third mode) based on the identified signal output state. For example, the communication operation mode may be determined based on the type of communication method of wireless communication being performed. According to an embodiment, when the electronic device 101 is in a situation in which an electromagnetic wave output limiting condition (e.g., an SAR regulation) is applied, the electronic device 101 may operate in at least one communication operation mode. For example, the situation in which the electromagnetic wave output limiting condition is applied may include a situation in which a user approaches within a configured distance on the basis of the electronic device 101 and/or a situation in which an output restriction on a signal transmitted by the electronic device 101 has been placed.

For example, when wireless communication is performed by only one of a plurality of communication methods (e.g., an LTE method, a WiFi method, and/or a BT method), the processor 120 may operate in the first mode. For example, when performing only LTE communication, the processor 120 may supply an LTE module (e.g., the LTE module 311 in FIG. 3) with transmission power that is configured in accordance with the first mode. Referring to Table 2, when operating in the first mode for LTE communication, the processor 120 may output an LTE signal having signal intensity of first LTE intensity (e.g., about 24 dBm) or less.

Furthermore, for example, when performing wireless communication using two of a plurality of communication methods, the processor 120 may operate in the second mode. For example, when performing LTE communication and BT communication together, the processor 120 may supply first transmission power to the LTE module 311, and may supply second transmission power to a BT module (e.g., the BT module 313 in FIG. 3). Referring to Table 2, when operating in the second mode for LTE communication, the processor 120 may output an LTE signal having signal intensity of second LTE intensity (e.g., about 21 dBm) or less. When operating in the second mode for BT communication, the processor 120 may output a BT signal having signal intensity of second BT intensity (e.g., about 10 dBm) or less. For example, the signal output in the second mode may be a communication signal having relatively lower intensity than the signal output in the first mode. Furthermore, for example, when performing wireless communication using three of a plurality of communication methods, the processor 120 may operate in the third mode. For example, when performing LTE communication, WiFi communication, and/or BT communication together, the processor 120 may supply the LTE module 311 with first' transmission power, may supply the WiFi module 312 with second' transmission power, and may supply the BT module 313 with third' transmission power. Referring to Table 2, when operating in the third mode for LTE communication, the processor 120 may output an LTE signal having signal intensity of third LTE intensity (e.g., about 18 dBm) or less. When operating in the third mode for WiFi communication, the processor 120 may output a WiFi signal having signal intensity of third WiFi intensity (e.g., about 13 dBm) or less. When operating in the third mode for BT communication, the processor 120 may output a BT signal having signal intensity of third BT intensity (e.g., about 8 dBm) or less. For example, the signal output in the third mode may be a communication signal having relatively lower intensity than the signal output in the second mode. According to an embodiment, the processor 120 may independently supply transmission power with respect to each of one or more communication methods. For example, the processor 120 may differently supply transmission power for each communication method so that the best communication performance is implemented.

In operation 505, the processor 120 may determine transmission power for each communication method based on use pattern information. The use pattern information 322 may include a ratio (e.g., the ratio of time used, the ratio of the amount of data used, and/or the ratio of frequency of use) of wireless communication that is performed by a user based on a plurality of communication methods. According to an embodiment, the processor 120 may differently determine a communication operation mode corresponding to each communication method, based on the use pattern information. For example, when a use ratio of LTE communication among the LTE communication, WiFi communication, and/ or BT communication is greater than 50%, the processor 120 may supply transmission power that is supplied to the LTE module 311 relatively most greatly. According to an embodiment, the processor 120 may implement the best communication performance for a communication method that is chiefly used for each user. According to an embodiment, the processor 120 may provide the best communication performance for each user.

Figure 6A:
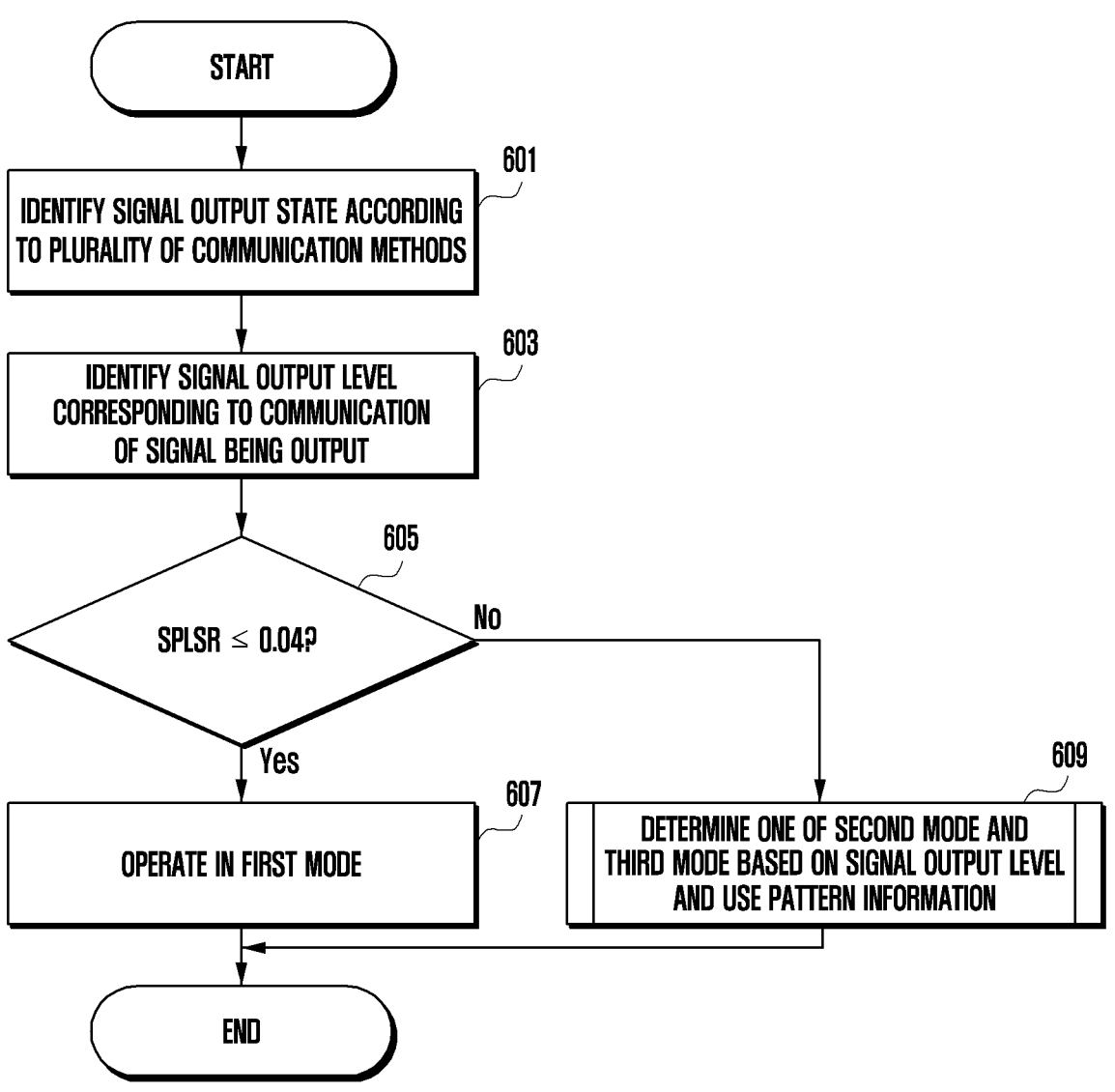
FIG. 6A is a flowchart illustrating a method of selecting one of a plurality of communication modes according to an SAR regulation that is calculated based on an isolation distance between antennas according to an embodiment of the disclosure.

FIG. 6A is a flowchart illustrating a method of selecting one of a plurality of communication modes according to an SAR regulation that is calculated based on an isolation distance between antennas according to an embodiment of the disclosure.

Figure 6B:
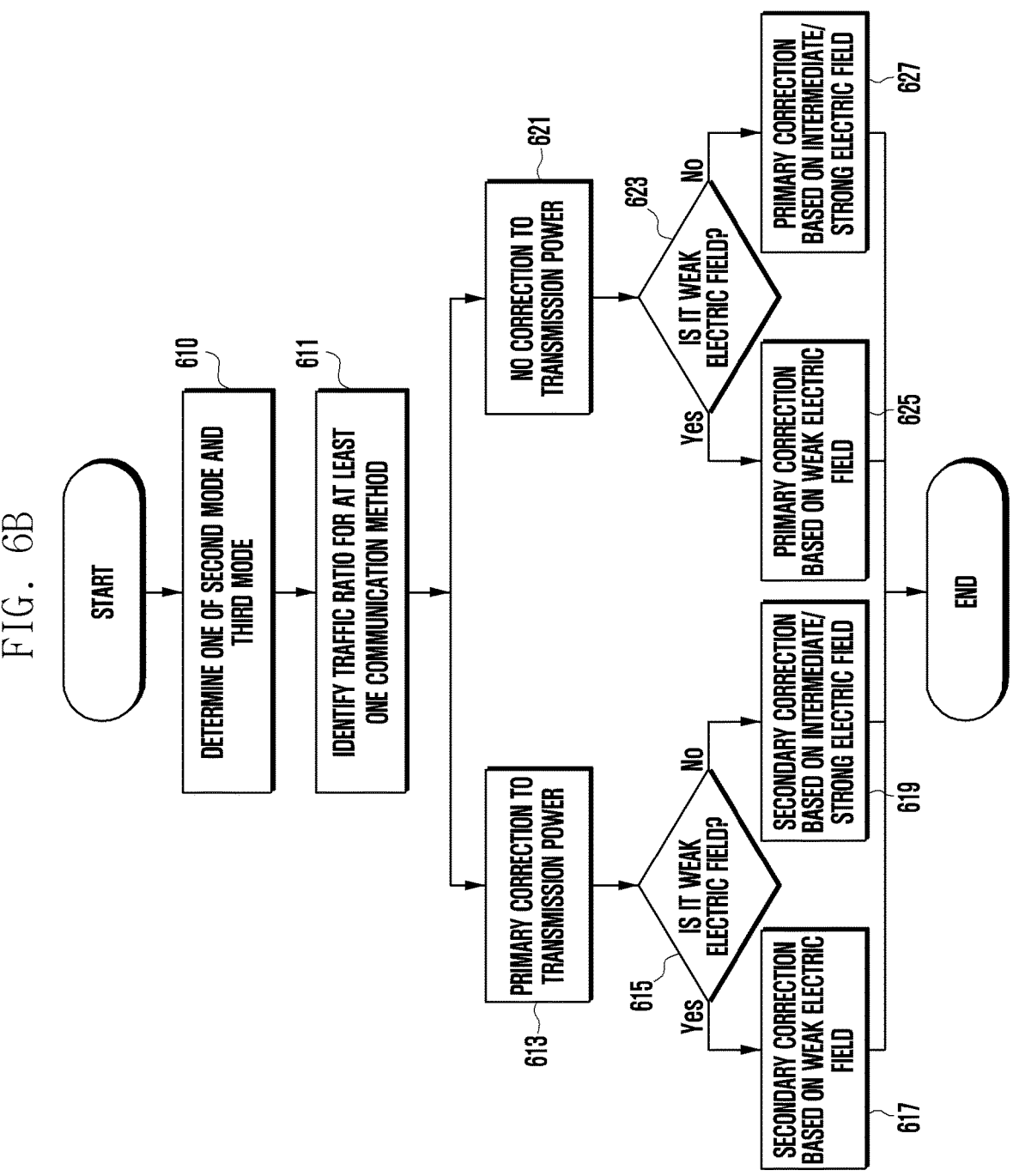
FIG. 6B is a flowchart illustrating a method of selecting one of a plurality of communication modes by taking into consideration traffic and an electric field situation according to an embodiment of the disclosure.

FIG. 6B is a flowchart illustrating a method of selecting one of a plurality of communication modes by taking into consideration traffic and an electric field situation according to an embodiment of the disclosure.

FIG. 6B is a flowchart subdividing and illustrating a process for operation 609 in FIG. 6A. Operation 609 in FIG. 6A may include an operational process illustrated in FIG. 6B.

An electronic device (e.g., the electronic device 101 in FIG. 1) in FIGS. 6A and 6B may be at least partially similar to the electronic device 101 in FIG. 2 or may further include other embodiments of the electronic device 101. The electronic device 101 in FIGS. 6A and 6B may include at least one element illustrated in FIG. 3.

Referring to FIG. 6A, in operation 601, a processor (e.g., the processor 120 in FIG. 1) of the electronic device 101 may identify a signal output state according to a plurality of communication methods (e.g., LTE communication, WiFi communication, and/or BT communication). For example, the processor 120 may identify whether a communication signal according to at least one communication method is being transmitted, based on transmission power supplied through a battery (e.g., the battery 189 in FIG. 1). The processor 120 may individually identify whether wireless communication for each of the plurality of communication methods is being performed.

In operation 603, the processor 120 may identify a signal output level (e.g., transmission power) corresponding to a communication method of a signal being output (e.g., a communication method of wireless communication being performed). The processor 120 may calculate an SAR to peak location separation ratio (SPLSR) based on the identified signal output level.

According to an embodiment, an SAR to peak location separation ratio (SPLSR) may be used as a reference value for determining whether an SAR regulation (e.g., an electromagnetic wave limiting condition (e.g., the sum of the SARs is less than about 1.6 W/Kg)) is satisfied. For example, if the electronic device 101 performs LTE communication based on an LTE communication method, an LTE antenna (e.g., an LTE transmission antenna) through which an LTE signal is transmitted may be implemented in plural, and may be disposed by being spaced apart from each other within the electronic device 101. For example, the processor 120 may supply transmission power based on the LTE antenna, and electromagnetic waves may occur based on the supplied transmission power. The greater the transmission power, the higher the summed intensity of the electromagnetic waves may be. For example, if two LTE antennas have more than a configured threshold value and are disposed by being spaced apart from each other, whether an SAR regulation is satisfied may be identified based on the SPLSR.

In operation 605, the processor 120 may identify whether the SPLSR is about 0.04 or less. For example, if an isolation distance between two LTE antennas (e.g., a first antenna and a second antenna) is R, the SPLSR may be calculated by using the following equation. Furthermore, for example, the isolation distance R between the first antenna and the second antenna may be in the state in which the isolation distance R has been previously stored in a memory (e.g., the memory 130 in FIG. 1). The processor 120 may load the memory 130 and check the isolation distance R.

$$R = \sqrt{(x_1 - x_2)^2 + (y_1 - y_2)^2} \qquad \text{Equation 1}$$

$$SPLSR = \frac{SAR_1 + SAR_2^{1.5}}{R} \qquad \text{Equation 2}$$

In calculating the isolation distance R between the two antennas, if the first antenna is disposed at coordinates (x1, y1) and the second antenna is disposed at coordinates (x2, y2), the processor 120 may calculate the isolation distance R between the first antenna and the second antenna by using Equation 1. For example, $SAR_1$ may include a first communication reference value for the first antenna, and $SAR_2$ may include a second communication reference value for the second antenna. For example, the communication reference value may include a limit value of a transmission power value in which an SAR regulation has been taken into consideration. The processor 120 may calculate the SPLSR by using Equation 2, and may check whether the SPLSR is about 0.04 or less.

When the SPLSR is about 0.04 or less in operation 605, in operation 607, the processor 120 may operate in the first mode (e.g., a normal mode). For example, the normal mode may be a communication operation mode when the electronic device 101 performs wireless communication while satisfying an SAR regulation. When the SPLSR is about 0.04 or less, the processor 120 may operate in the normal mode in the condition in which an SAR regulation is satisfied, and may perform wireless communication based on at least one communication method. In the normal mode, the electronic device 101 may perform wireless communication based on at least one communication method.

When the SPLSR is greater than about 0.04 in operation 605, in operation 609, the processor 120 may determine one of the second mode (e.g., a bad mode) and/or the third mode (e.g., the worst mode) and may operate. For example, the second mode and/or the third mode may be an operation mode in which a transmission power value is configured to be relatively low compared to the first mode. For example, the processor 120 may determine one of the second mode, and/or the third mode based on the signal output level identified in operation 603 and use pattern information stored in the memory 130.

According to an embodiment, the electronic device 101 may calculate the SPLSR in order to identify whether an SAR regulation has been satisfied, may select one of a plurality of communication operation modes (e.g., the first mode, the second mode, and/or the third mode) based on the SPLSR, and may operate in the selected operation mode. For example, in general, the plurality of communication operation modes may include the first mode (e.g., the normal mode) in which a wireless communication operation is performed by supplying transmission power configured in a plurality of communication methods, the second mode (e.g., a hard mode) in which wireless communication performance is at least partially lowered by lowering transmission power supplied to the plurality of communication methods in stages, and the third mode (e.g., the worst mode). For example, the second mode may be a mode which has lower wireless communication performance than the first mode, but has more excellent wireless communication performance than the third mode. All of the first mode, the second mode, and/or the third mode may be operation modes in the state in which an SAR regulation is satisfied. For example, in the second mode and the third mode, transmission power supplied to at least one communication method may be lowered so that wireless communication is at least partially limited compared to the first mode. When operating in the second mode and the third mode, the processor 120 of the electronic device 101 may configure a transmission power value supplied to at least communication method, among a plurality of communication methods, to be at least partially low.

Referring to FIG. 6B, in operation 610, the processor 120 may determine one of the second mode (e.g., the bad mode) and the third mode (e.g., the worst mode). FIG. 6B may be a flowchart subdividing and illustrating operation 609 in FIG. 6A. The second mode and the third mode may perform operation 611 to operation 627 except different degrees thereof.

In operation 611, the processor 120 may identify traffic ratio for at least one of a plurality of communication methods. For example, the processor 120 may check the use time of LTE communication, the use time of WiFi communication, and the use time of BT communication for a configured time (e.g., a day, 24 hours, a week, or a month), among communication methods (e.g., LTE communication, WiFi communication, and/or BT communication) which may be supported by the electronic device 101, and may identify traffic ratio corresponding to each communication method. For example, if the use time of the LTE communication is about 12 hours, the use time of the WiFi communication is about 6 hours, and the use time of the BT communication is about 2 hours on the basis of a day (e.g., a configured time), a traffic ratio may be determined as (0.6:0.3:0.1). According to an embodiment, the processor 120 may at least partially correct transmission power (e.g., output power) supplied to each communication method, based on a traffic ratio corresponding to each communication method.

Table 4 below may indicate the degree of corrections to transmission power according to the traffic ratio.

TABLE 4

|  | Traffic ratios | Corrections according to traffic ratios |
|---|---|---|
| LTE communication | Ratio > 0.6 | LTE communication reference value (of mode) + 1 dBm |
|  | 0.3 < ratio ≤ 0.6 | Maintain LTE communication reference value (of mode) (maintain transmission power) |
|  | Ratio ≤ 0.3 | LTE communication reference value (of mode) − 1 dBm |
| WiFi Communication | Ratio > 0.6 | WiFi communication reference value (of mode) + 0.5 dBm |
|  | 0.3 < ratio ≤ 0.6 | Maintain WiFi communication reference value (of mode) (maintain transmission power) |
|  | Ratio ≤ 0.3 | WiFi communication reference value (of mode) − 0.5 dBm |
| BT communication | Ratio > 0.6 | Increase some of BT communication reference value (of mode) |
|  | 0.3 < ratio ≤ 0.6 | Maintain BT communication reference value (of mode) (maintain transmission power) |
|  | Ratio ≤ 0.3 | Decrease some of BT communication reference value (of mode) |

For example, when the traffic ratio is (0.6:0.3:0.1), the LTE communication reference value may be increased by about 1 dBm in the case of the LTE communication, the WiFi communication reference value may be maintained in the case of the WiFi communication, and the BT communication reference value may be at least partially decreased in the case of the BT communication. For example, when the electronic device 101 operates in the second mode, the processor 120 may increase, maintain, and/or decrease a configured transmission power value on the basis of a communication reference value that is determined based on the second mode. For example, referring to Table 1, the configured transmission power value may be determined as about 1 dBm in accordance with the LTE communication, and may be determined as about 0.5 dBm in accordance with the WiFi communication. A transmission power value for the BT communication may be configured to be relatively small compared to the LTE communication and the WiFi communication. According to an embodiment, a communication reference value determined based on the second mode and a communication reference value based on the third mode may be differently configured. For example, a communication reference value based on the third mode may be configured to be relatively lower than a communication reference value determined based on the second mode.

Referring to Table 4, in the state in which the traffic ratio is LTE communication: about 0.6, WiFi communication: about 0.3, and BT communication: about 0.1, the processor 120 may supply a transmission power value corresponding to an LTE module (e.g., the LTE module 311 in FIG. 3) that supports the LTE communication by increasing the transmission power value by about 1 dBm. The processor 120 may maintain a transmission power value corresponding to a WiFi module (e.g., the WiFi module 312 in FIG. 3) that supports the WiFi communication identically with a previous transmission power value. The processor 120 may supply a transmission power value corresponding to a BT module (e.g., the BT module 313 in FIG. 3) that supports the BT communication by decreasing some of the transmission power value. The degree of change in transmission power attributable to a change in a communication reference value corresponding to at least one communication method may be differently configured based on each communication method. Referring to Table 1, the degree of change in transmission power according to each communication method may be identified.

In operation 613, the processor 120 may perform a primary correction to transmission power based on the traffic ratio. In contrast, in operation 621, the processor 120 may perform a non-correction to transmission power based on the traffic ratio. According to another embodiment, the electronic device 101 may omit a correction operation (e.g., operation 621) on transmission power based on the traffic ratio.

In operation 615, the processor 120 may identify whether an electric field situation is a weak electric field situation. For example, the electric field situation may be divided into a weak electric field, an intermediate electric field, and/or a strong electric field in stages, but the disclosure is not limited thereto. The electric field situation may be determined as at least one of a weak electric field, an intermediate electric field, and/or a strong electric field based on a configured condition (e.g., a configured threshold value). According to an embodiment, when the electric field situation is the weak electric field situation, the processor 120 may increase communication performance by configuring transmission power that is supplied to at least one communication method to be high, or may maintain communication performance by maintaining the transmission power. When the electric field situation is the strong electric field situation, the processor 120 may configure transmission power that is supplied to at least one communication method to be low. In the strong electric field situation, although transmission power is low supplied, the electronic device 101 may maintain the existing communication performance. According to an embodiment, the processor 120 may determine transmission power that is supplied to at least one communication method based on an electric field situation.

In operation 617, the processor 120 may perform a secondary correction to transmission power according to the weak electric field in accordance with at least one communication method. In operation 619, the processor 120 may perform a secondary correction to transmission power according to the intermediate electric field and/or the strong electric field in accordance with at least one communication method. For example, the processor 120 may configure transmission power to be at least partially high when the electric field situation is the weak electric field, and may configure transmission power to be at least partially low when the electric field situation is the intermediate electric field or the strong electric field. Table 5 below may indicate the degree of corrections to transmission power according to an electric field situation.

TABLE 5

| | Electric field situations | Corrections according to electric field situations |
|---|---|---|
| LTE communication | Electric field value ≤ −90 dBm | LTE communication reference value (of mode) + 1 dBm |
| | −90 dBm < electric field value ≤ −80 dBm | Maintain LTE communication reference value (of mode) (maintain transmission power) |
| | Electric field value > −80 dBm | LTE communication reference value (of mode) − 1 dBm |

TABLE 5-continued

| | Electric field situations | Corrections according to electric field situations |
|---|---|---|
| WiFi communication | Electric field value ≤ −70 dBm | WiFi communication reference value (of mode) + 0.5 dBm |
| | −70 dBm < electric field value ≤ −60 dBm | Maintain WiFi communication reference value (of mode) (maintain transmission power) |
| | Electric field value > −60 dBm | WiFi communication reference value (of mode) − 0.5 dBm |
| BT communication | Electric field value ≤ −70 dBm | Increase some of BT communication reference value (of mode) |
| | −70 dBm < electric field value ≤ −60 dBm | Maintain BT communication reference value (of mode) (maintain transmission power) |
| | Electric field value > −60 dBm | Decrease some of BT communication reference value (of mode) |

According to an embodiment, the electric field situation may be determined as at least one of the weak electric field, the intermediate electric field, and/or the strong electric field based on a configured condition (e.g., a configured threshold value) according to each communication method. The range of an electric field value for distinguishing between the electric field situations may be differently configured based on each communication method.

For example, when an electric field value corresponding to LTE communication is about −90 dBm or less, the processor 120 may identify that an electric field situation is the weak electric field, and may increase an LTE communication reference value for the LTE communication by about 1 dBm. In the weak electric field situation, the processor 120 may supply the LTE module 311 with transmission power that is configured to be relatively higher (e.g., transmission power corresponding to the LTE communication reference value), and may perform corrections so that communication performance for the LTE communication is improved.

In operation 619, the processor 120 may perform a secondary correction to transmission power based on the intermediate electric field or the strong electric field in accordance with at least one communication method. Referring to Table 5, the processor 120 may maintain a communication reference value identically with a previous communication reference value when the electric field situation is the intermediate electric field, and may configure a communication reference value to be lower than a previous communication reference value when the electric field situation is the strong electric field. For example, in the state in which LTE communication is performed, when an electric field value corresponding to the LTE communication is greater than about −90 dBm and is about −80 dBm or less, the processor 120 may identify that the electric field situation is the intermediate electric field situation, and may maintain an LTE communication reference value for the LTE communication identically with a previous LTE communication reference value. For example, in the state in which LTE communication is performed, when an electric field value corresponding to the LTE communication is greater than about −80 dBm, the processor 120 may identify that the electric field situation is the strong electric field situation, and may decrease an LTE communication reference value for the LTE communication by about 1 dBm. For example, when the electric field situation is the strong electric field, the processor 120 may maintain previous communication performance although relatively low transmission power is supplied to a communication module.

According to an embodiment, a communication reference value may be differently determined based on at least one mode (e.g., the second mode or the third mode). For example, a communication reference value determined based on the third mode may be configured to be relatively lower than a communication reference value determined based on the second mode.

Although a correction to transmission power based on the traffic ratio is not performed in operation 621, in operation 623, the processor 120 may identify whether the electric field situation is the weak electric field situation.

In operation 625, the processor 120 may perform a correction to transmission power based on the weak electric field in accordance with at least one communication method. In operation 627, the processor 120 may perform a correction to transmission power based on the intermediate electric field and/or the strong electric field in accordance with at least one communication method. For example, the processor 120 may configure transmission power to be at least partially high when the electric field situation is the weak electric field, and may configure transmission power to be at least partially low when the electric field situation is the intermediate electric field or the strong electric field. In operation 625 and operation 627, transmission power may be corrected based on Table 5 as in operation 617 and operation 619.

According to an embodiment, the electronic device 101 may primarily correct a communication reference value (e.g., an LTE communication reference value, a WiFi communication reference value, and/or a BT communication reference value) based on a traffic ratio based on at least one communication method (e.g., LTE communication, WiFi communication, and/or BT communication), and may secondarily correct a communication reference value based on an electric field situation (e.g., the weak electric field, the intermediate electric field, and/or the strong electric field). According to an embodiment, the processor 120 of the electronic device 101 may supply each communication module (e.g., the LTE module 311 in FIG. 3, the WiFi module 312, and/or the BT module 313) with a transmission power value corresponding to a communication reference value, based on each communication method. For example, the processor 120 may supply the LTE module 311 with a first transmission power value, may supply the WiFi module 312 with a second transmission power value, and may supply the BT module 313 with a third transmission power value.

With reference to Table 2, the electronic device 101 may be in the state in which all of an LTE communication method, a WiFi communication method, and/or a BT communication method are being performed. The electronic device 101 may be in the state in which a communication reference value corresponding to at least one communication method has been configured as the condition in which an SAR regulation (e.g., an electromagnetic wave limiting condition (e.g., the sum of SARs is within a maximum of 1.6 W/Kg)) is satisfied. For example, an LTE communication reference value corresponding to LTE communication may be configured as about 18 dBm that corresponds to an SAR value of about 1.0 W/Kg. A WiFi communication reference value corresponding to WiFi communication may be configured as about 13 dBm that corresponds to an SAR value of about 0.4 W/Kg. A BT communication reference value corresponding to BT communication may be configured as about 8 dBm that corresponds to an SAR value of 0.2 W/Kg.

For example, the processor 120 may supply the LTE module 311 with a transmission power value of about 18 dBm, may supply the WiFi module 312 with a transmission power value of about 13 dBm, and may supply the BT module 313 with a transmission power value of about 8 dBm. Referring to Table 1, a transmission power value corresponding to each communication reference value may be differently configured based on each communication method. The processor 120 may correct a communication reference value that is configured based on a traffic ratio and an electric field situation according to each communication method, and may adjust a transmission power value based on the correction of the communication reference value.

According to an embodiment, the electronic device 101 may comprehensively identify an electric field situation according to a plurality of communication methods, and may determine whether to correct transmission power based on the electric field situation. For example, when an electronic field situation of all communication methods is a weak electric field situation or a strong electric field situation, the electronic device 101 may not perform a correction to transmission power based on an electric field situation. According to an embodiment, if a weak electric field and a strong electric field are mixed based on a plurality of communication methods, the processor 120 may divide a communication reference value in a communication method having a strong electric field situation and incorporate the reduced communication reference value to a communication method having a weak electric field situation. For example, if LTE communication is a strong electric field situation, and WiFi communication and BT communication are a weak electric field situation, the processor 120 may determine an LTE communication reference value corresponding to the LTE communication by decreasing the LTE communication reference value by about 1 dBm, and may determine a WiFi communication reference value corresponding to the WiFi communication and a BT communication reference value corresponding to the BT communication by increasing each of the WiFi communication reference value and the BT communication reference value by about 0.5 dBm. According to an embodiment, the electronic device 101 may maintain the sum of communication reference values to about 1.6 W/Kg on the basis of an SAR value, while satisfying an SAR regulation.

According to another embodiment, the electronic device 101 may identify a signal output state according to a method corresponding to at least one communication method, and may determine whether wireless communication based on each communication method is being performed. For example, identifying whether wireless communication is being performed may include identifying whether the transmission and reception of data based on a corresponding communication method occurs. For example, when the transmission and reception of data according to LTE communication occurs, the processor 120 may identify that the LTE communication has been activated. According to an embodiment, the processor 120 may configure transmission power higher than that for a communication method of wireless communication being performed, and can improve overall wireless communication performance. In contrast, the processor 120 may block transmission power for a communication method of wireless communication being not performed, and can reduce unnecessarily consumed transmission power. The processor 120 can maintain wireless communication longer by reducing power consumption.

According to another embodiment, when at least two communication methods are substantially simultaneously performed based on at least one communication method (e.g., LTE communication, WiFi communication, and/or BT communication), the electronic device 101 may take into consideration a traffic ratio based on each communication method and an electric field situation based on each communication method, and may at least partially adjust a communication reference value corresponding to transmission power. FIG. 6B has been limited to the case of an operation in one of the second mode (e.g., a bad mode) and the third mode (e.g., the worst), but the disclosure is not limited thereto. According to another embodiment, the electronic device 101 may take into consideration a traffic ratio based on each communication method and an electric field situation based on each communication method regardless of a specific mode (e.g., the first mode, the second mode, or the third mode), and may at least partially adjust a communication reference value corresponding to transmission power.

A method according to various embodiments may include an operation of identifying an output state of a signal corresponding to at least one communication method by using a communication module (e.g., the communication module 190 in FIG. 1), an operation of detecting a signal output level corresponding to the at least one communication method of the signal being output, an operation of identifying use pattern information corresponding to the at least one communication method (e.g., the use pattern information 322 in FIG. 3) through the communication module, and an operation of adjusting a transmission power value corresponding to the at least one communication method, based on the detected signal output level and the use pattern information 322.

A method according to an embodiment may further include an operation of supplying a transmission power value corresponding to the at least one communication method while satisfying an electromagnetic wave limiting condition (e.g., an SAR regulation), based on the at least one communication method.

A method according to an embodiment may further include an operation of identifying a reference value for satisfying the electromagnetic wave limiting condition, an operation of determining a first communication reference value corresponding to a first communication method and a second communication reference value corresponding to a second communication method, based on the reference value, and an operation of determining a first transmission power value corresponding to the first communication method, based on the first communication reference value, and determining a second transmission power value corresponding to the second communication method, based on the second communication reference value.

A method according to an embodiment may further include an operation of transmitting a first communication signal based on the first transmission power value through a first antenna of a first communication module by supplying the first transmission power value to the first communication module corresponding to the first communication method, and an operation of transmitting a second communication signal based on the second transmission power value through a second antenna of a second communication module by supplying the second transmission power value to the second communication module corresponding to the second communication method.

A method according to an embodiment may further include an operation of checking an isolation distance between a first antenna and a second antenna that transmit signals based on the first communication method, and an operation of configuring at least one of the first transmission power value and/or the second transmission power value to be low when an SAR to peak location separation ratio (SPLSR) calculated by using the checked distance is greater than a threshold value.

The operation of adjusting the transmission power value according to an embodiment may include an operation of identifying a use ratio (e.g., a traffic ratio) corresponding to the at least one communication method based on the identified signal output state, and an operation of adjusting the transmission power value corresponding to the at least one communication method, based on the identified use ratio.

The operation of adjusting the transmission power value according to an embodiment may include an operation of identifying an electric field situation based on the detected signal output level, and an operation of adjusting the transmission power value corresponding to the at least one communication method based on the identified electric field situation.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a transceiver supporting at least one communication method;
 memory, comprising one or more storage media, storing instructions; and
 one or more processors communicatively coupled to the transceiver and the memory, wherein the instructions, when executed by the one or more processors individually or collectively, cause the electronic device to:
  identify an output state of a signal corresponding to the at least one communication method through the transceiver,
  detect a signal output level corresponding to the at least one communication method,
  identify use pattern information corresponding to the at least one communication method through the transceiver,
  identify a reference value for satisfying an electromagnetic wave limiting condition,
  determine a first communication reference value corresponding to a first communication method and a second communication reference value corresponding to a second communication method, based on the reference value and the use pattern information, and
  determine a first transmission power value corresponding to the first communication method and a second transmission power value corresponding to the second communication method based on the detected signal output level, the first communication reference value, and the second communication reference value, and
 wherein the use pattern information includes a ratio of communication performed via the at least one communication method among a plurality of communication methods supported by the electronic device.

2. The electronic device of claim 1, wherein the instructions, when executed by the one or more processors individually or collectively, further cause the electronic device to supply a transmission power value corresponding to the at least one communication method while satisfying the electromagnetic wave limiting condition.

3. The electronic device of claim 2, wherein the instructions, when executed by the one or more processors individually or collectively, further cause the electronic device to:
 determine the transmission power value corresponding to the at least one communication method, based on the identified reference value.

4. The electronic device of claim 3, wherein the instructions, when executed by the one or more processors individually or collectively, further cause the electronic device to:
 supply the first transmission power value to a first transceiver corresponding to the first communication method,
 transmit a first communication signal based on the first transmission power value through a first antenna of the first transceiver,
 supply the second transmission power value to a second transceiver corresponding to the second communication method, and
 transmit a second communication signal based on the second transmission power value through a second antenna of the second transceiver.

5. The electronic device of claim 3, wherein the instructions, when executed by the one or more processors individually or collectively, further cause the electronic device to:
 check an isolation distance between a first antenna and a second antenna transmitting a signal, based on the first communication method, and
 configure at least one of the first transmission power value or the second transmission power value to be low when a specific absorption rate (SAR) to peak location separation ratio (SPLSR) calculated by using the checked isolation distance is greater than a threshold value.

6. The electronic device of claim 1, wherein the instructions, when executed by the one or more processors individually or collectively, further cause the electronic device to:

identify a use ratio corresponding to the at least one communication method based on the identified signal output state, and adjust a transmission power value corresponding to the at least one communication method, based on the identified use ratio.

7. The electronic device of claim 1, wherein the instructions, when executed by the one or more processors individually or collectively, further cause the electronic device to:

identify an electric field situation based on the detected signal output level, and adjust a transmission power value corresponding to the at least one communication method, based on the identified electric field situation.

8. The electronic device of claim 7, wherein the instructions, when executed by the one or more processors individually or collectively, further cause the electronic device to maintain the transmission power value based on a communication method being in a weak electric field state, based on the at least one communication method.

9. The electronic device of claim 1, wherein the transceiver comprises a long term evolution (LTE) transceiver supporting LTE communication, a WiFi transceiver supporting WiFi communication, and a Bluetooth (BT) transceiver supporting BT communication.

10. The electronic device of claim 1, wherein the ratio of the communication comprises at least one of a ratio of time used, a ratio of an amount of data used, or a ratio of frequency of use based on the at least one communication method.

11. The electronic device of claim 1, wherein the use pattern information includes information in which a time for which a long term evolution (LTE) is activated, a time for which a WiFi is activated, and a time for which a Bluetooth (BT) is activated.

12. A method comprising:

identifying an output state of a signal corresponding to at least one communication method by using a transceiver;

detecting a signal output level corresponding to the at least one communication method;

identifying use pattern information corresponding to the at least one communication method through the transceiver;

identifying a reference value for satisfying an electromagnetic wave limiting condition;

determining a first communication reference value corresponding to a first communication method and a second communication reference value corresponding to a second communication method, based on the reference value and the use pattern information; and determining a first transmission power value corresponding to the first communication method and a second transmission power value corresponding to the second communication method, based on the detected signal output level, the first communication reference value, and the second communication reference value, wherein the use pattern information includes a ratio of communication performed via the at least one communication method among a plurality of communication methods supported by an electronic device.

13. The method of claim 12, further comprising:

supplying a transmission power value corresponding to the at least one communication method while satisfying the electromagnetic wave limiting condition, based on the at least one communication method.

14. The method of claim 13, further comprising:

transmitting a first communication signal based on the first transmission power value through a first antenna of a first transceiver by supplying the first transmission power value to the first transceiver corresponding to the first communication method; and transmitting a second communication signal based on the second transmission power value through a second antenna of a second transceiver by supplying the second transmission power value to the second transceiver corresponding to the second communication method.

15. The method of claim 13, further comprising:

checking an isolation distance between a first antenna and a second antenna transmitting a signal, based on a first communication method; and configuring at least one of a first transmission power value or a second transmission power value to be low when an SAR to peak location separation ratio (SPLSR) calculated by using the checked isolation distance is greater than a threshold value, wherein both the first antenna and the second antenna are LTE antennas in case the first communication method is a long-term evolution (LTE) communication method.

16. The method of claim 12, wherein the determining of the first transmission power value comprises:

identifying a use ratio corresponding to the at least one communication method, based on the identified signal output state; and adjusting a transmission power value corresponding to the at least one communication method, based on the identified use ratio.

17. The method of claim 12, wherein the determining of the first transmission power value comprises:

identifying an electric field situation based on the detected signal output level; and adjusting a transmission power value corresponding to the at least one communication method, based on the identified electric field situation.

18. The method of claim 12, wherein the at least one communication method corresponds to at least one of a long-term evolution (LTE) communication method, a WiFi communication method, or a Bluetooth (BT) communication method.

19. The method of claim 12, wherein the signal output level corresponding to the at least one communication method is detected based on a transmission power supplied through a battery.

* * * * *